United States Patent
Kountanis et al.

[11] 3,792,610
[45] Feb. 19, 1974

[54] FLOW METER

[75] Inventors: Bill Kountanis, Oakley; Paul V. Piper, Hayward, both of Calif.

[73] Assignee: BPN Associates, Inc., Oakley, Calif.

[22] Filed: Oct. 4, 1971

[21] Appl. No.: 186,019

[52] U.S. Cl. .................................. 73/229
[51] Int. Cl. .............................. G01f 1/06
[58] Field of Search 73/229, 230, 231, 194 E, 194 M

[56] References Cited
UNITED STATES PATENTS

| | | | |
|---|---|---|---|
| 314,480 | 3/1885 | Rosenkranz et al. | 73/229 |
| 1,963,330 | 6/1934 | Lumme | 73/230 X |
| 2,859,616 | 11/1958 | Fellows | 73/231 R X |
| 3,021,710 | 2/1962 | Barrere et al. | 73/229 |
| 3,360,989 | 1/1968 | Herrington | 73/229 |

Primary Examiner—Richard C. Queisser
Assistant Examiner—Stephen A. Kreitman
Attorney, Agent, or Firm—Harris Zimmerman

[57] ABSTRACT

A flow meter wherein increased linear flow range is obtained by providing a straight through flow path with very little pressure drop through the device in conjunction with a paddle wheel of low inertia design and detection system devoid of the introduction of rotational drag. The meter also features a simple pulse detection and digital processing circuit for processing the detected flow rate signal without requirement of expensive regulated power supplies and precision components.

6 Claims, 3 Drawing Figures

PATENTED FEB 19 1974
3,792,610
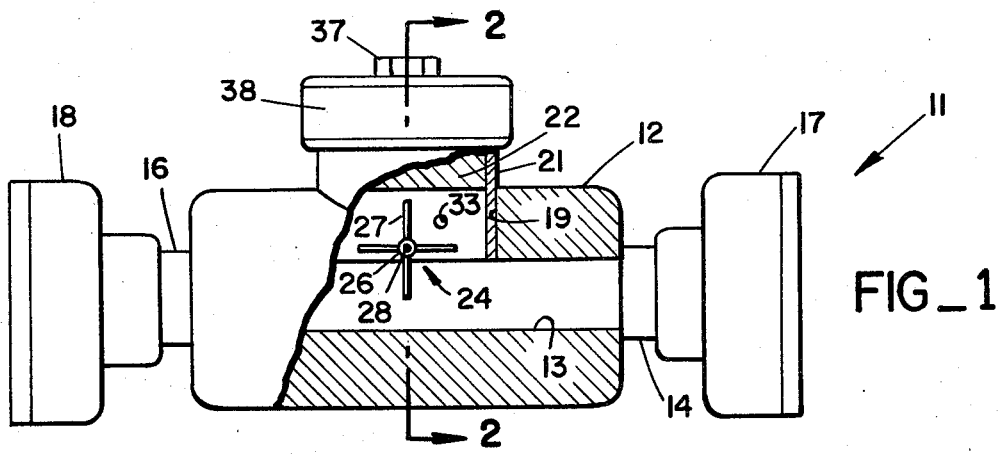
FIG_1
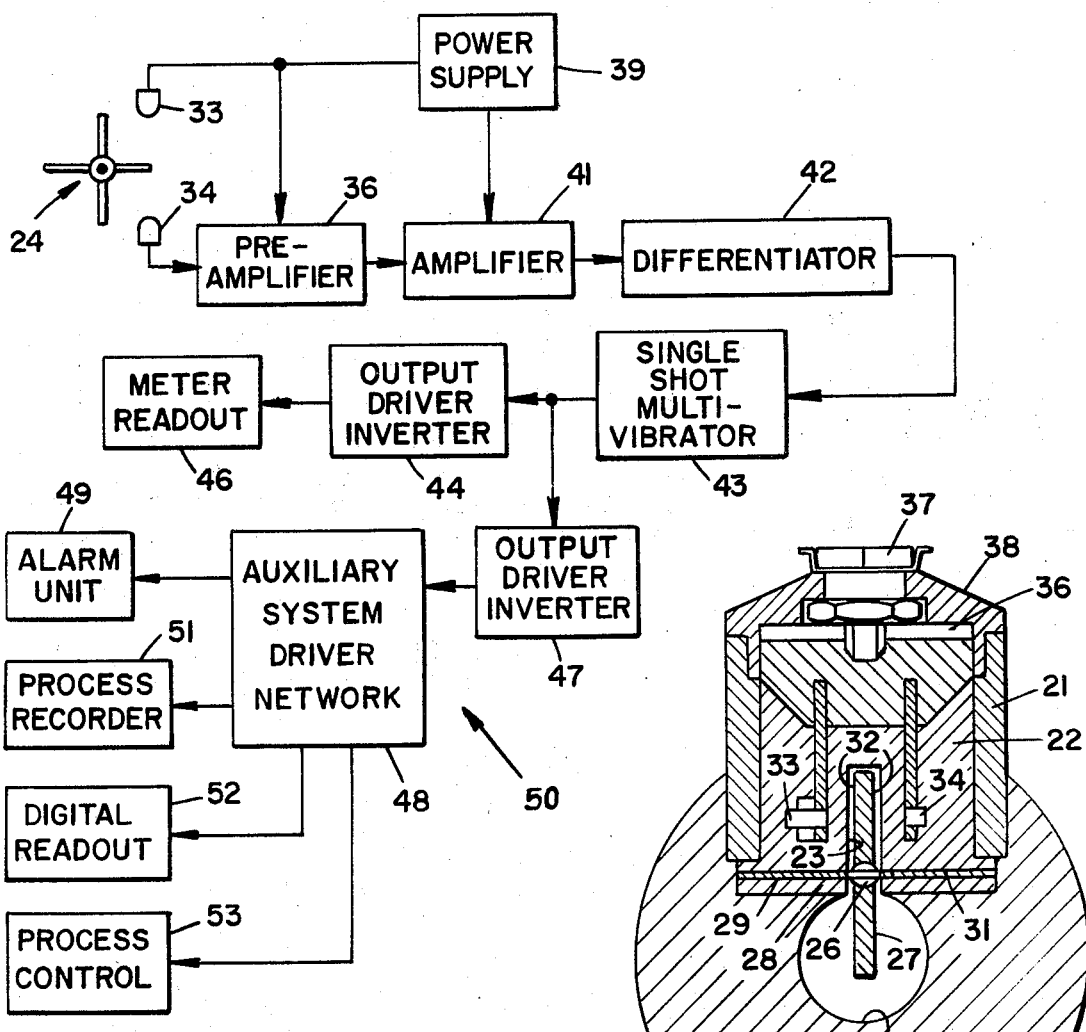
FIG_3
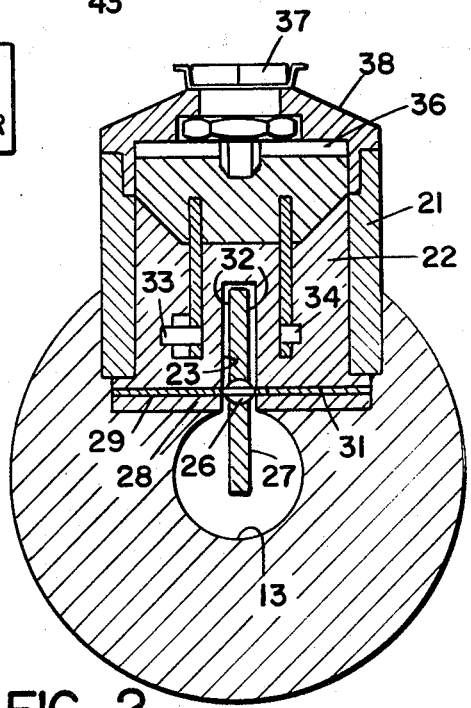
FIG_2

FLOW METER

BACKGROUND OF THE INVENTION

Existing flow meters typically have three inherent disadvantages, i.e., high pressure loss, limited range, and high cost of the meter and associated readout system. In some meters these disadvantages are interrelated while other meters provide solutions for only some of the disadvantages.

SUMMARY OF THE INVENTION

The general object of the present invention is to provide a flow meter having a low pressure loss, increased linear flow range, and relatively simple and inexpensive pulse detection and digital readout circuit for processing the detected flow rate signal.

A more specific object of the invention is the provision of a flow meter having a low inertia paddle wheel journalled within a very narrow cavity communicating with and offset from a main flow path straight through the device in order to introduce very little pressure drop and provide increased flow range.

It is another object of the invention to provide a flow meter of the class described having a photo-electric detection system for modulation by the paddle wheel in order to facilitate electrical generation of a flow rate signal without the introduction of rotational drag to the wheel, thereby providing increased flow range.

Still another object of the invention is to provide a flow meter of the above-described type wherein the requirement of expensive regulated power supplies and precision components in the pulse detection and readout circuit is eliminated.

It is a further object of the invention to provide a flow meter having a simple amplifier mounted as an integral part of the detection system located in the flow meter body in order to reduce auxiliary instrumentation requirements and provide an increased pulse signal output for use with long cables.

BRIEF DESCRIPTION OF THE DRAWINGS

FIG. 1 is a side elevational view with portions broken away of a flow meter in accordance with the present invention.

FIG. 2 is a sectional view taken at line 2—2 of FIG. 1.

FIG. 3 is a schematic circuit diagram of the photoelectric detection and read-out circuitry associated with the flow meter.

DETAILED DESCRIPTION OF THE INVENTION

Referring now to the drawings in detail, FIGS. 1 and 2 in particular, a flow meter 11 in accordance with the present invention will be seen to include a cylindrical body 12 having a coaxial bore 13 fitted at its opposite ends with pipe stubs 14 and 16 which terminate in connectors 17 and 18 for connecting into a flow line. Centrally of the body 12 there is provided a radial bore 19 which extends therein to a point of narrow tangential communication with bore 13. a tubular stub 21 is secured within the bore 19, and such stub coaxially contains a cylindrical plug assembly 22 within which there is provided a cavity 23 of narrow rectangular cross section in communication with bore 13 at its narrow point of communication with bore 19. In this manner, the narrow cavity 23 is provided in offset relation to the main flow path defined by bore 13.

A low inertia paddle wheel 24 is journalled for rotation within cavity 23 between the opposite parallel side walls thereof. The paddle wheel includes a central hub 26 having a plurality of circumferentially spaced paddles 27 projecting radially therefrom. The hub may be provided with a fixed central shaft 28 having its opposite ends journalled in low friction bearings 29 and 31 provided in the opposite sides of cavity 23. Alternatively, the shaft may be fixed in the opposite sides of the cavity and the hub 26 formed of suitable material to define a journal bearing which freely rotates on the shaft. In any event, the paddles have narrow widths which are designed to clear the cavity walls in closely spaced relation so that only very narrow passages 32 exist between the cavity walls and paddles. As a result, the flow path through the meter is substantially confined to the substantially straight through path defined by bore 13 which introduces very little pressure drop and thereby contributes to increased flow range.

As a further contributing factor to low pressure drop through the flow meter, the narrowness of the paddles 27 present a very low aspect to flow through the bore 13. In addition, the wheel 24 preferably includes but four paddles spaced at 90° circumferential intervals in order that they successively enter the main flow path through bore 13 from cavity 23 one at a time and are disposed in the bore no more than two at a time. In this manner, the aspect of the paddles in the main flow path is further reduced and the pressure drop and flow range are further reduced and increased, respectively.

In order that the rotational velocity of the paddle wheel 24 be converted to an electrical signal representative of flow through bore 13, suitable detection means are associated with the paddle wheel, and as another important feature of the invention the detection means are arranged to not introduce rotational drag to the system. In this regard, the detection means comprise a light source 33 and photo-electric detector 34 respectively mounted in the opposite side walls of cavity 23. The source 33 beams light energy on detector 34, and the light beam is pulse modulated by the rotation of the paddle wheel 24. Each time a paddle 27 traverses the beam, the signal output of detector 34 is pulse modulated, with the rate of modulation being proportional to the rate of fluid flow to be metered. More particularly, the paddles 27 may be opaque to interrupt the beam in instances where light transparent fluids are to be metered. For fluids allowing only a small amount of light to be transmitted, the paddles are transparent to thereby provide increased light transmission each time a paddle traverses the beam. In either case, a pulse modulated electrical signal is generated by detector 34.

The light source 33 and detector 34 are preferably encapsulated in plug assembly 22, and the detector is advantageously electrically connected to a miniaturized solid-state pre-amplifier 36 also encapsulated in the assembly. A connector 37 is preferably secured by means of a cap 38 to the outer end of the stub 21, and the connector is associated with plug assembly 22 to supply electrical operating power to the light source, detector, and pre-amplifier, as well as to provide an output from the pre-amplifier. The connector 37 is thus the only electrical attachment that is required for operation of the flow meter 11. By virtue of the integral incorporation of the pre-amplifier 36 in the flow meter, auxiliary instrumentation requirements in the meter read-out system are reduced and an increased pulse signal output is provided for use with long cables.

Considering now a preferred pulse detection and read-out circuit 50 for use with the flow meter 11 hereinbefore described, reference is made to FIG. 3 wherein it is to be noted that power supply 39 is connected via connector 37 to the light source 33 and pre-amplifier 36, as well as to an input amplifier 41 of such circuit. The output of amplifier 41 is applied to a differentiator 42 which develops positive and negative pulse spikes respectively in time correspondence with the leading and trailing edges of the pulse modulated signal output of detector 34. The positive or negative spikes from the differentiator are thus at the rate of the pulse modulated signal and are hence representative of the rotational velocity of paddle wheel 24, and thus the rate of flow through the meter 11. One set of spikes, for example the positive ones, are employed to trigger a single shot multivibrator 43 which responsively generates a train of pulses corresponding to the number of pulses received from flow meter 11 per unit of time, but which are of fixed pulse duration independent of the pulse duration of the meter pulses. The multivibrator output is coupled as by means of an output driver inverter 44 to a standard meter readout 46 which provides an indication of the pulse rate and thus of the fluid flow rate. In addition, the multivibrator output may be coupled as by means of a second output driver inverter 47 to an auxiliary system driver network 48 which is arranged to provide the required drive for an alarm unit 49, process recorder 51, digital readout 52, and process control 53 which may be either analog or digital in nature.

We claim:

1. A flow meter comprising a body having a bore of constant cross-sectional area extending axially therethrough for communication with a flow system to be metered for a rate of flow, said body intermediate the ends thereof having a narrow radial cavity offset from and in communication with said bore, a wheel having a central hub and a plurality of narrow paddles extending radially therefrom and journalled for bidirectional rotation within said cavity about an axis normal to said bore axis, said axis and said hub being also offset from said bore such that no portion of said hub extends into said bore, the radial outer portions of said paddles partially peripherally extending into said bore during wheel rotation, said cavity having opposed side walls and an end wall with the latter being generally equidistant from the axis of rotation of said paddle wheel, said paddles having a depth along the axis of rotation of said paddle wheel substantially the same as the thickness of said paddles in a direction normal to said axis of rotation, the ends of said paddles as measured along said axis of rotation being positioned closely adjacent said cavity side walls, and the tips of said paddles being positioned closely adjacent said passage end wall, and detection means associated with said wheel for generating an electrical signal indicative of the rotational velocity thereof, said flow meter being further defined by said bore having its opposite ends terminating in flow connectors, said body having a radial bore extending therein to a point of narrow tangential communication with said axial bore, a tubular stub received in said radial bore, and cylindrical plug means disposed within said stub, said plug means having said cavity defined therein, said cavity being of narrow rectangular cross section and being in com-munication with said axial bore at said point of narrow tangential communication.

2. A flow meter according to claim 1, further defined by said detection means comprising a photo-electric detector encapsulated in said plug means adjacent one side wall of said cavity, and a light source encapsulated in said plug means adjacent the opposite side of said cavity for directing light upon said detector for interception by said paddles during rotation of said wheel.

3. A flow meter according to claim 2, further defined by a miniature solid state pre-amplifier encapsulated in said plug means and coupled to said detector, and an electrical connector carried by a cap secured to the outer end of said stub, said connector coupled to said light source and pre-amplifier.

4. A flow meter comprising a body having an axial bore extending therethrough adapted for communication with a flow system to be metered for rate of flow, means defining a narrow cavity in offset relation to and in communication with said bore, a paddle wheel journalled for rotation within said cavity, said wheel having paddles adapted to extend into said bore during wheel rotation, said paddles having opposite sides closely spaced to the opposite side walls of said cavity to define very narrow passages therebetween, and detection means associated with said paddle wheel for generating an electrical signal indicative of the rotational velocity thereof, said axial bore having its opposite ends terminating in flow connectors, said body having a radial bore extending therein to a point of narrow tangential communication with said axial bore, a tubular stub received in said radial bore, and cylindrical plug means disposed within said stub, said plug means having said cavity defined therein, said cavity being of narrow rectangular cross section and being in communication with said axial bore at said point of narrow tangential communication.

5. A flow meter according to claim 4, further defined by said detection means comprising a photo-electric detector encapsulated in said plug means adjacent one side wall of said cavity, and a light source encapsulated in said plug means adjacent the opposite side of said cavity for directing light upon said detector for interception by said paddles during rotation of said wheel.

6. A flow meter according to claim 5, further defined by a miniature solid state pre-amplifier encapsulated in said plug means and coupled to said detector, and an electrical connector carried by a cap secured to the outer end of said stub, said connector coupled to said light source and pre-amplifier.

* * * * *